C. E. DODGE & T. E. EGAN.
PRUNING IMPLEMENT.
APPLICATION FILED JULY 17, 1915.
1,181,579.
Patented May 2, 1916.
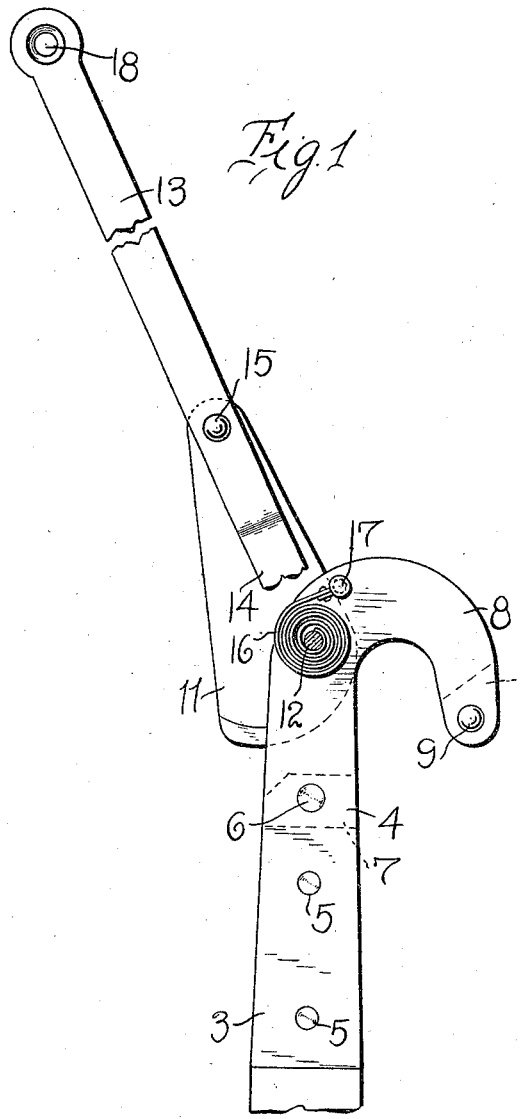
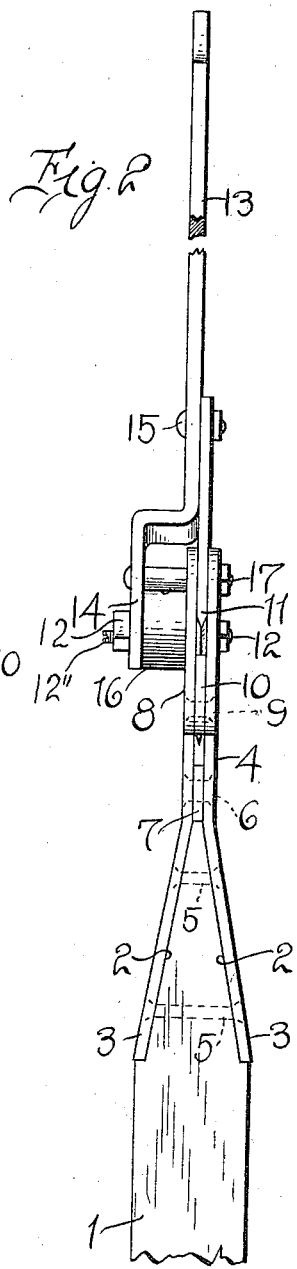
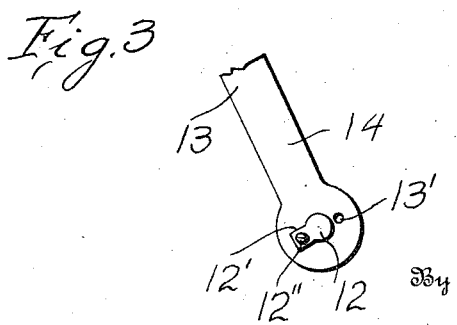
Inventors
C. E. Dodge,
T. E. Egan
By Watson E. Coleman
Attorney

UNITED STATES PATENT OFFICE.

CHARLES E. DODGE AND THEODORE E. EGAN, OF MISSOULA, MONTANA.

PRUNING IMPLEMENT.

1,181,579.  Specification of Letters Patent.  Patented May 2, 1916.

Application filed July 17, 1915. Serial No. 40,464.

*To all whom it may concern:*

Be it known that we, CHARLES E. DODGE and THEODORE E. EGAN, citizens of the United States, residing at Missoula, in the county of Missoula and State of Montana, have invented certain new and useful Improvements in Pruning Implements, of which the following is a specification, reference being had to the accompanying drawings.

This invention has for its primary object a durable, light and efficient construction of pruning implement designed for use in pruning trees, and of the type in which the blade is operated by means of a cord or cable attached to a lever fulcrumed on a hook mounted upon the end of a pole or handle of any desired length, whereby the uppermost boughs of the tree can be easily reached and cut. And the invention also aims to generally improve devices of this class so as to render them more useful and commercially desirable.

With these and other objects in view, as will more fully appear as the description proceeds, the invention consists in certain constructions, arrangements and combinations of the parts that I shall hereinafter more fully describe and claim.

For a full understanding of the invention, reference is to be had to the following description and accompanying drawing, in which—

Figure 1 is a side elevation of a pruning implement embodying the improvements of our invention, parts being broken away and in section. Fig. 2 is an edge view of the device. Fig. 3 is a fragmentary view of the lever showing the means for varying the tension of the lever actuating spring.

Corresponding and like parts are referred to in the following description and designated in all of the views of the accompanying drawing by like reference characters.

Referring to the drawing, the numeral 1 designates the pole or handle of our improved pruner, the same being preferably composed of wood, as is customary in connection with these devices, and being preferably tapered or beveled on opposite sides at one end, as indicated at 2. Applied to the beveled sides of the pole or handle 1 are the upwardly converging end portions 3 of metallic straps or bars 4 that are secured to the handle or pole 1 by means of rivets 5 and that are preferably also secured together by means of a rivet 6, a spacer 7 being interposed between the bars so as to hold them properly spaced from each other, and the bars being curved to form a hook 8, the bill of which faces in a relatively downward direction which is customary. Preferably the relatively free extremities of the bars 3 are secured together by a rivet 9 or similar fastening device, and have a spacer 10 interposed therebetween, whereby it will be understood that the hook is composed of two spaced members.

11 designates the knife or blade. This is received between the spaced portions of the hook 8 and is pivotally mounted upon a bolt 12 or the like extending through the spaced members of the hook, and projecting laterally to one side thereof. The blade 11 is actuated by means of a lever 13 provided at one end with an offset portion 14 the outer end of which is pivotally mounted upon the pivot bolt 12 in spaced relation to the hook 8, as clearly illustrated in the drawing, said lever being connected, as by a bolt or similar fastening device 15, to one end of the blade 11. A coiled spring 16 is secured at one end upon the pivot bolt 12 and at its other end is secured to a pin 17 which extends through the spaced members of the hook 8 and projects to one side thereof, like the bolt 12. Thus it will be understood that the spring 16 exerts a tension upon the blade 11 and lever 13 whereby the latter will be held in a relatively elevated position and the blade in its inoperative position with the bill of the hook 8 clear to receive the twig or bough to be cut in the pruning operation. The lever 13 is formed at its relatively free end with an eye 18 whereby a rope or cable may be conveniently secured thereto and the device operated from the ground.

From the foregoing description in connection with the accompanying drawing, the operation of our pruning implement will be apparent. In the practical use of the device, the operator, by drawing down upon the rope or cable, will swing the lever 13 downwardly so as to sweep the knife in between the spaced members of the bill portion of the hook 8 and cut the bough received in the hook, the coiled spring 16 operating to instantly and automatically return the parts to their relatively inoperative position when the tension upon the cord or cable is released.

It will thus be seen that we have provided a very durable and efficient construction of pruning device, the parts of which may be very cheaply constructed and readily assembled and which will be light, which is an end to be desired in connection with devices of this kind, particularly when comparatively long poles or handles are necessary.

While the accompanying drawing illustrates what we believe to be the preferred embodiment of our invention, it is to be understood that the invention is not limited thereto, but that various changes may be made in the construction, arrangements and proportions of the parts without departing from the scope of invention as defined in the appended claim.

Preferably the bolt 12 is provided with a lug 12' carrying a set screw 12", and the lever 13 is formed with any desired number of apertures 13' to receive the screw whereby a wrench may be applied to the bolt and the latter turned so as to increase the tension of the spring 16 at will, without dismantling the implement.

What is claimed, is:—

A pruning implement, comprising a handle, a hook carried thereby embodying spaced members, a pivot bolt extending through said members and projecting to one side thereof, a blade pivotally mounted adjacent its inner end upon said bolt whereby the inner end of the blade is movable between said members, a lever connected to the outer end of the blade and having an offset portion the extremity of which is pivoted upon said bolt in spaced relation to the hook, means whereby an operating device may be secured to the outer end of the lever, a spring coiled around said bolt and secured at one end thereto, a pin secured to the hook and extending therefrom and projecting to one side thereof and connected to the other end of said spring, the bolt being provided with a lug and a set screw carried by said lug, the lever being formed with a plurality of apertures to receive said screw whereby the tension of the spring may be regulated.

In testimony whereof we hereunto affix our signatures in the presence of two witnesses.

CHARLES E. DODGE.
THEODORE E. EGAN.

Witnesses:
W. H. MURPHY,
H. L. DAVIS.

Copies of this patent may be obtained for five cents each, by addressing the "Commissioner of Patents, Washington, D. C."